May 8, 1962 E. STAUDT ET AL 3,033,089
EXPOSURE CONTROL SYSTEMS FOR PHOTOGRAPHIC CAMERAS
Filed May 31, 1960 3 Sheets-Sheet 1

Erwin Staudt
Paul Härter
INVENTORS

BY R. Frank Smith
Robert W. Hampton
ATTORNEYS

Erwin Staudt
Paul Härter
INVENTORS

May 8, 1962  E. STAUDT ET AL  3,033,089
EXPOSURE CONTROL SYSTEMS FOR PHOTOGRAPHIC CAMERAS
Filed May 31, 1960  3 Sheets-Sheet 3
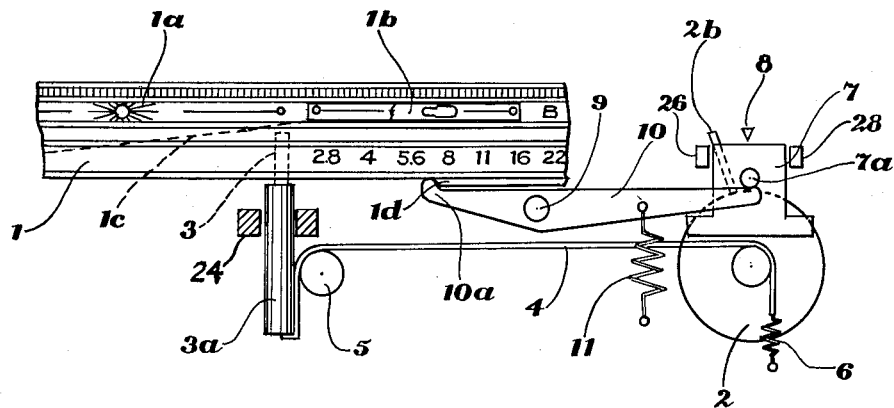
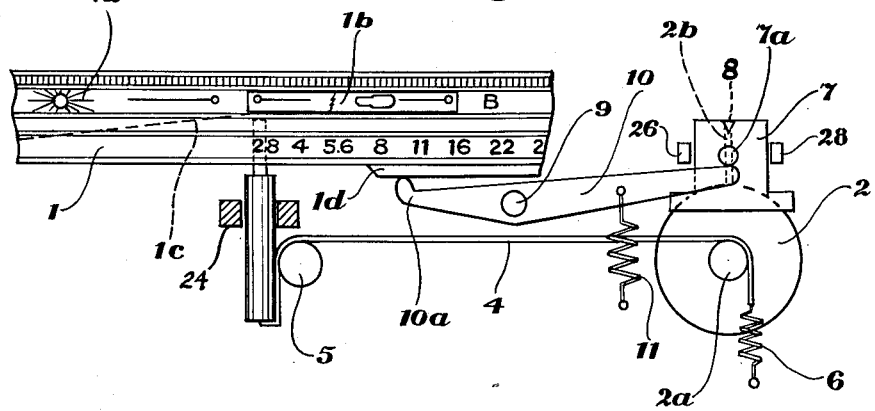
Erwin Staudt
Paul Härter
INVENTORS 3,033,089
EXPOSURE CONTROL SYSTEMS FOR
PHOTOGRAPHIC CAMERAS
Erwin Staudt and Paul Härter, Stuttgart-Wangen, Germany, assignors to Eastman Kodak Company, Rochester, N.Y.
Filed May 31, 1960, Ser. No. 32,858
4 Claims. (Cl. 95—10)

The present invention concerns photographic cameras having built-in exposure meters, and more particularly concerns such cameras wherein a pointer of the exposure meter is visually aligned with another member under manual control for adjusting the exposure system of the camera in accordance with prevailing light conditions.

In automatic exposure control systems of the above type the meter is commonly rotated for aligning its pointer with a fixed mark to indicate proper setting of the exposure mechanism. In still cameras of this type, which are adapted for flash operation as well as for daylight operation, it is desirable to disable the automatic exposure control system when the camera is adjusted for flash operation. However, in prior art cameras where the exposure control system is disabled during flash operation it is still possible to align the meter pointer with its comparison member or mark and thereby erroneously advise the camera operator that the exposure control system is properly set.

It is therefore a primary object of the present invention to prevent visual pointer matching in a camera of the above type when such camera is adjusted by flash operation.

More particularly it is an object of the invention to prevent rotation of the exposure meter when the camera is adjusted for flash operation, whereas such rotation normally occurs for setting the exposure mechanism during daylight operation.

Another object of the invention is to mask the meter pointer and thereby prevent the camera operator from seeing it when the camera is adjusted for flash operation.

Other objects of the invention will appear from the following description, reference being made to the accompanying drawings, wherein:

FIG. 5 is a schematic side view of an alternate form of the invention, adjusted for daylight operation; and FIG. 6 illustrates the mechanism of FIG. 5 adjusted for flash operation.

Figure 1:
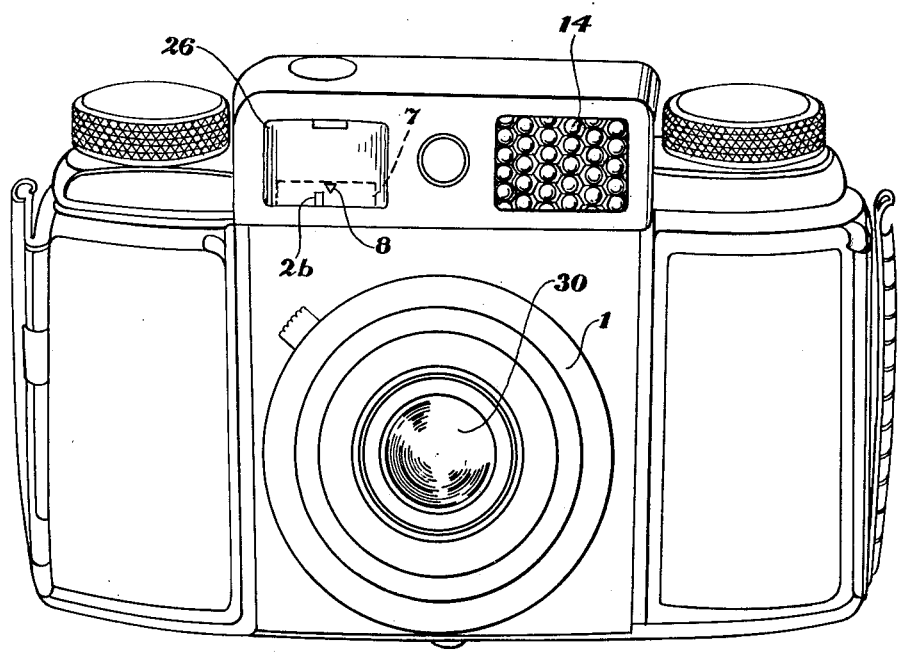
FIG. 1 is a front view of a camera embodying the present invention.
Figure 2:
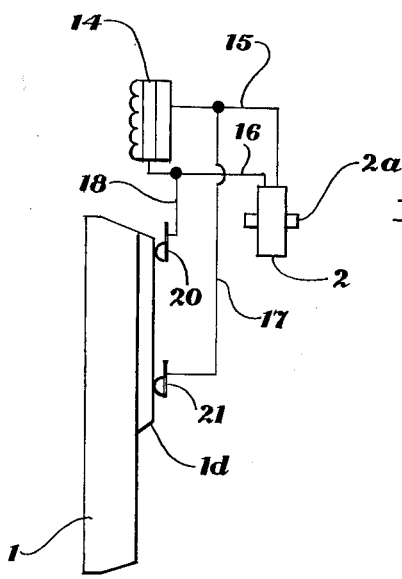
FIG. 2 is a schematic side view of the exposure adjusting mechanism and a wiring diagram of the photocell, exposure meter and shorting contacts.

Referring to FIGS. 1 to 4, the diaphragm ring 1 of the camera is mounted for rotation about the axis of the taking lens 30 of the camera. This ring has two angular opererating ranges, one for daylight operation, the other for flash operation. In either of the operating ranges of ring 1, the camera diaphragm may be adjusted through its full range of openings. A control ring of this type and the aperture-varying mechanism adjusted thereby are illustrated in U.S. Patents 328,033 and 2,917,983.

The camera embodying the present invention employs a photocell 14 (FIGS. 1 and 2) connected by a pair of leads 15 and 16 to an exposure meter 2 (see also FIGS. 3 to 6), the body of which is rotatably mounted on a shaft 2a. During daylight operation of the camera, a pointer 2b (FIGS. 1, 3 and 4) of the meter moves relative to the meter body as a function of scene brightness. When the diaphragm ring 1 is turned to its flash range, a conducting member 1d engages a pair of contacts 20 and 21 and thereby short-circuits the meter 2 through a pair of leads 17 and 18 connected to leads 15 and 16, respectively. This disables the meter, whose pointer then returns to a zero position relative to the meter body.

Figure 3:
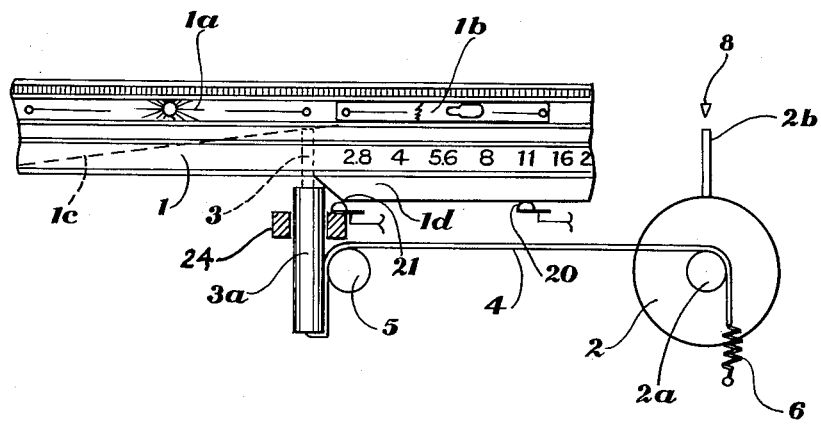
FIG. 3 is a schematic side view of the exposure control mechanism showing its interrelation with the exposure meter during daylight operation.
Figure 4:
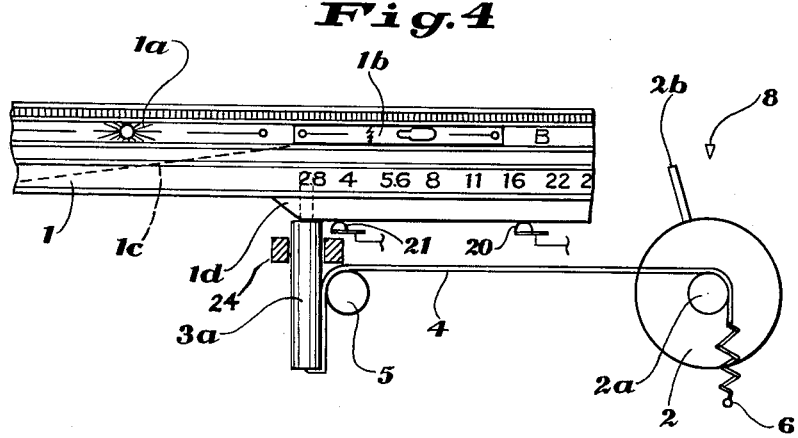
FIG. 4 illustrates the mechanism of FIG. 3 when the exposure control device is adjusted for flash operation.

During daylight operation of the camera, the conducting member 1d is out of engagement with contact 21, as shown in FIG. 3, and thereby cannot short-circuit the meter and disable its operation. For adjusting the diaphragm during daylight operation, ring 1 is rotated within its daylight range and a cam surface 1c (FIG. 3) cooperates with a tip 3 of a plunger 3a for moving the latter in a direction parallel to the lens axis and through a distance which is a function of the angular position of ring 1. Plunger 3a is guided in bearings such as 24. A cord 4 is attached to one end of plunger 3a and moves over a pulley 5 and the meter shaft 2a, which may extend at right angles to pulley 5, although it is illustrated for simplicity as being parallel to that pulley. The other end of cord 4 is attached to a spring 6 which is secured to a fixed member in the camera. As the diaphragm ring 1 is rotated within its daylight range, plunger 3a moves toward and away from member 1, thereby moving cord 4 over the meter axis 2a against the tension of spring 6 and thereby rotating the entire meter body and its pointer 2b as a function of the position of ring 1. The shape of cam 1c and the length and disposition of cord 4 are such that the meter pointer 2b is aligned with a fixed mark 8 whenever ring 1 is at an angular position wherein it properly adjusts the exposure mechanism in accordance with scene brightness. Pointer 2b may be aligned visually in the camera viewfinder 26, as shown in FIG. 1.

It will be obvious that with the structure described above it would be possible to disable the exposure meter by short-circuiting it, yet move the instrument pointer into alignment with its reference mark 8, thereby falsely indicating to the camera operator that the exposure mechanism is properly set, even though ring 1 is in the angular range corresponding to flash operation. In order to prevent such false indication, the conducting member 1d also constitutes a second cam surface, which cooperates with plunger 3a when ring 1 is turned to its flash range. Cam 1d moves plunger 3a away from ring 1 and holds the meter body in its zero position relative to the camera, so that the pointer 2b, which is in its zero position relative to the meter body, cannot be aligned with the reference mark 8.

In FIGS. 5 and 6 there is illustrated a second embodiment of the mechanism for preventing a false indication in the viewfinder of an apparently proper exposure setting. The conducting member and cam 1d cooperates with one arm 10a of a lever 10, which is pivoted at 9. When the diaphragm ring 1 is turned to its flash range, as shown in FIG. 6, cam 1d rocks lever 10a counterclockwise about pivot 9 against the tension of a spring 11, thereby moving the right-hand end (as viewed in FIGS. 5 and 6) of lever 10 upward. This end of lever 10 underlies a pin 7a on a mask 7, which is guided for vertical movement between a pair of members 26 and 28. When lever 10 is rocked counterclockwise, it moves pin 7a and mask 7 upward to cover pointer 2b and its reference mark 8 so that they are not visible in the viewfinder. This position of mask 7 is shown in broken lines in FIG. 1.

The invention has been described in detail with particular reference to preferred embodiments thereof, but it will be understood that variations and modifications can be effected within the spirit and scope of the invention as described hereinabove and as defined in the appended claims.

We claim:
1. In a camera, the combination comprising: an exposure meter including (a) a photocell disposed for illumination by scene light, (b) a movable meter body, and (c) a pointer controlled by said photocell as a function of scene brightness for movement relative to said body and relative to an index mark and to a viewing window framing said pointer and said index mark; an adjustable lens diaphragm having a range of aperture sizes; a manually movable regulating member having two ranges of movement and coupled to said lens diaphragm for adjusting the diaphragm through its full range of aperture sizes by movement of said regulating member through either of its two ranges of movement; means interrelating said regulating member and said meter body for moving the latter in response to movement of said regulating member within at least one of its two ranges of movement, whereby said pointer may be visually aligned with said index mark in said viewing window to indicate proper adjustment of said diaphragm for existing scene brightness; means cooperating with said regulating member for maintaining said pointer at a predetermined position relative to said meter body throughout a first of said ranges of movement of said regulating member; a control member moving with said regulating member; and means controlled by said control member throughout said first range of movement of said regulating member to maintain said pointer out of visual alignment with said index mark in said viewing window.

2. In a camera, the combination comprising: an exposure meter including (a) a photocell disposed for illumination by scene light, (b) a movable meter body, and (c) a pointer controlled by said photocell as a function of scene brightness for movement relative to said body and relative to an index mark and to a viewing window framing said pointer and said index mark; an adjustable lens diaphragm having a range of aperture sizes; a manually movable regulating member having two ranges of movement and coupled to said lens diaphragm for adjusting the diaphragm through its full range of aperture sizes by movement of said regulating member through either of its two ranges of movement; means interrelating said regulating member and said meter body for moving the latter in response to movement of said regulating member within at least one of its two ranges of movement, whereby said pointer may be visually aligned with said index mark in said viewing window to indicate proper adjustment of said diaphragm for existing scene brightness; means cooperating with said regulating member for maintaining said pointer in a predetermined position relative to said meter body throughout a first of said ranges of movement of said regulating member; and a control member moving with said regulating member and cooperating with said interrelating means to maintain said meter body at a predetermined position relative to said camera throughout said first range of movement of said regulating member for maintaining said pointer out of visual alignment with said index mark in said viewing window.

3. In a camera, the combination comprising: an exposure meter including (a) a photocell disposed for illumination by scene light, (b) a movable meter body, and (c) a pointer controlled by said photocell as a function of scene brightness for movement relative to said body and relative to an index mark and to a viewing window framing said pointer and said index mark; an adjustable lens diaphragm having a range of aperture sizes; a manually movable regulating member having two ranges of movement and coupled to said lens diaphragm for adjusting the diaphragm through its full range of aperture sizes by movement of said regulating member through either of its two ranges of movement; means interrelating said regulating member and said meter body for moving the latter in response to movement of said regulating member within at least one of its two ranges of movement, whereby said pointer may be visually aligned with said index mark in said viewing window to indicate proper adjustment of said diaphragm for existing scene brightness; a control member moving with said regulating member; a mask adapted to be moved between a first position and a second position and disposed, in said second position, for masking said pointer and said index mark from visual observation in said viewing window; and means cooperating with said control member and said mask for maintaining said mask in its second position throughout said first range of movement of said regulating member.

4. In a camera, the combination comprising: an exposure meter including (a) a photocell disposed for illumination by scene light, (b) a movable meter body, and (c) pointer controlled by said photocell as a function of scene brightness for movement relative to said body and relative to an index mark and to a viewing window framing said pointer and said index mark; an adjustable lens diaphragm having a range of aperture sizes; a manually movable regulating member having two ranges of movement and coupled to said lens diaphragm for adjusting the diaphragm through its full range of aperture sizes by movement of said regulating member through either of its two ranges of movement; means interrelating said regulating member and said meter body for moving the latter in response to movement of said regulating member within at least one of its two ranges of movement, whereby said pointer may be visually aligned with said index mark in said viewing window to indicate proper adjustment of said diaphragm for existing scene brightness; a control member moving with said regulating member; and means controlled by said control member throughout said first range of movement of said regulating member to maintain said pointer out of visual alignment with said index mark in said viewing window.

References Cited in the file of this patent
UNITED STATES PATENTS

| | | |
|---|---|---|
| 2,242,043 | Sanger | May 13, 1941 |
| 2,250,898 | Tonnies | July 29, 1941 |
| 2,340,622 | Simmon | Feb. 1, 1944 |